United States Patent
Lu et al.

(10) Patent No.: US 7,778,618 B2
(45) Date of Patent: Aug. 17, 2010

(54) SYSTEMS AND METHODS FOR REDUCING BROADBAND IMAGE NOISE THROUGH A PROGRAMMABLE BANDWIDTH RF VARIABLE GAIN ATTENUATOR

(75) Inventors: Jianhua Lu, San Diego, CA (US); Mark Santini, San Diego, CA (US); Weinan Gao, San Diego, CA (US); Mats Lindstrom, San Diego, CA (US); Damian Costa, San Diego, CA (US)

(73) Assignee: Conexant Systems, Inc., Newport Beach, CA (US)

( * ) Notice: Subject to any disclaimer, the term of this patent is extended or adjusted under 35 U.S.C. 154(b) by 772 days.

(21) Appl. No.: 11/617,054

(22) Filed: Dec. 28, 2006

(65) Prior Publication Data
US 2008/0160946 A1 Jul. 3, 2008

(51) Int. Cl.
 *H04B 1/06* (2006.01)
(52) U.S. Cl. ............... 455/234.2; 455/249.1; 455/302; 455/295; 455/296; 375/322; 375/279; 375/280
(58) Field of Classification Search .............. 455/234.2, 455/249.1, 302, 295, 296; 375/322, 279, 375/280
See application file for complete search history.

(56) References Cited

U.S. PATENT DOCUMENTS

| | | | | |
|---|---|---|---|---|
| 5,103,459 | A * | 4/1992 | Gilhousen et al. | 370/206 |
| 5,107,345 | A * | 4/1992 | Lee | 382/250 |
| 5,452,104 | A * | 9/1995 | Lee | 358/426.14 |
| 5,521,650 | A * | 5/1996 | Ku | 348/731 |
| 6,005,506 | A * | 12/1999 | Bazarjani et al. | 341/143 |
| 7,526,018 | B2 * | 4/2009 | Seo et al. | 375/219 |

* cited by examiner

*Primary Examiner*—Sanh D Phu
(74) *Attorney, Agent, or Firm*—Thomas, Kayden, Horstemeyer & Risley, LLP

(57) ABSTRACT

Systems for suppressing image noise are provided. In this regard, one embodiment includes a system for suppressing image noise comprising a low noise amplifier (LNA) configured to amplify a received RF signal, an RF variable gain attenuator with an image rejection filter with programmable bandwidth configured to suppress image noise and image interference, and an RF mixer configured to perform frequency translation.

15 Claims, 11 Drawing Sheets

SYSTEMS AND METHODS FOR REDUCING BROADBAND IMAGE NOISE THROUGH A PROGRAMMABLE BANDWIDTH RF VARIABLE GAIN ATTENUATOR

TECHNICAL FIELD

The present disclosure generally relates to implementation of image noise reduction in a broadband tuner.

BACKGROUND

Low noise amplifiers (LNAs) found in radio frequency (RF) tuners traditionally have a high gain in order to set the noise figure for the rest of the receiver. Unfortunately, the use of these LNAs also creates broadband noise, which appears at the image frequency band defined as $(2 \cdot f_{LO} - f_{RF})$, where $f_{LO}$ represents the local oscillator (LO) frequency and $f_{RF}$ is the RF frequency. The image noise is directly converted into the intermediate frequency (IF) band once it is fed into a mixer. Consequently, the image noise effectively increases the noise figure of the receiver and ultimately reduces the overall sensitivity of the receiver. In a broadband TV tuner based on a dual conversion receiver architecture, the received RF band signals (47 MHz to 870 MHz) are up converted to a higher fixed frequency (e.g., 1220 MHz) and then down converted to a low IF frequency (e.g., 10 MHz). The RF front-end up-conversion stage consists of a low noise amplifier, a variable gain RF attenuator and a RF mixer. For the dual-conversion broadband TV tuner, the image noise induced by a low noise amplifier at front-end may result in more than 3 dB addition to the cascaded noise figure of the receiver. This is potentially a critical issue which is often overlooked and which presents a potentially significant obstacle to achieving a low noise figure of the broadband RF front-end for TV tuner applications. Furthermore, for terrestrial TV applications, interference may exist in the image band. Unattenuated image interference reduces the signal-to-noise-distortion ratio (SNDR) below desired levels. This ultimately degrades the quality of the television signal viewed on the display.

To address these issues, various approaches are generally taken. One approach involves placing a filter immediately after the LNA stage in an effort to suppress any image noise. These filters will typically have a flat response over the frequency band 47 MHz to 870 MHz in order to avoid signal suppression. A conventional design typically involves placing a standalone passive filter before the RF mixer.

A standalone filter requires an extra buffer to drive the passive filter. However, the loss due to the passive filter in addition to the extra buffer stage actually contributes to the total noise figure. Therefore, the level of broadband noise suppression from standalone passive filters is limited. Furthermore, the extra buffer required for a passive filter results in additional power consumption.

Hence, the approach taken to address image noise in an RF front-end suffers from various perceived shortcomings including increased power consumption, additional loss, and increased noise, each of which can potentially lead to increased noise figures for a given system. This ultimately adversely affects receiver sensitivity.

SUMMARY

Systems and methods for suppressing image noise are provided. Briefly described, one embodiment, among others, is directed to a system for suppressing image noise comprising a low noise amplifier (LNA) configured to amplify a received RF signal, an RF variable gain attenuator with an image rejection filter with programmable bandwidth configured to suppress image noise and image interference, and an RF mixer configured to perform frequency translation.

Another embodiment of a system for suppressing image noise comprises a low noise amplifier (LNA) configured to amplify a received RF signal and an RF mixer with a V/I converter embedded with an image rejection filter with programmable bandwidth configured to suppress image noise and image interference.

Yet another embodiment is directed to a method for suppressing image noise comprising: receiving an RF signal, amplifying the RF signal, programming a frequency band such that any image noise present is located outside the frequency band, suppressing the image noise while allowing the RF signal to pass, and mixing the RF signal to perform frequency translation.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of a system and method for implementing a broadband RF tuner with a variable gain attenuator with programmable bandwidth can be better understood with reference to the following drawings. The components in the drawings are not necessarily to scale, emphasis instead being placed upon clearly illustrating the principles of suppressing broadband image noise. Moreover, in the drawings, like reference numerals designate corresponding parts throughout the several views.

DETAILED DESCRIPTION

Figure 1:
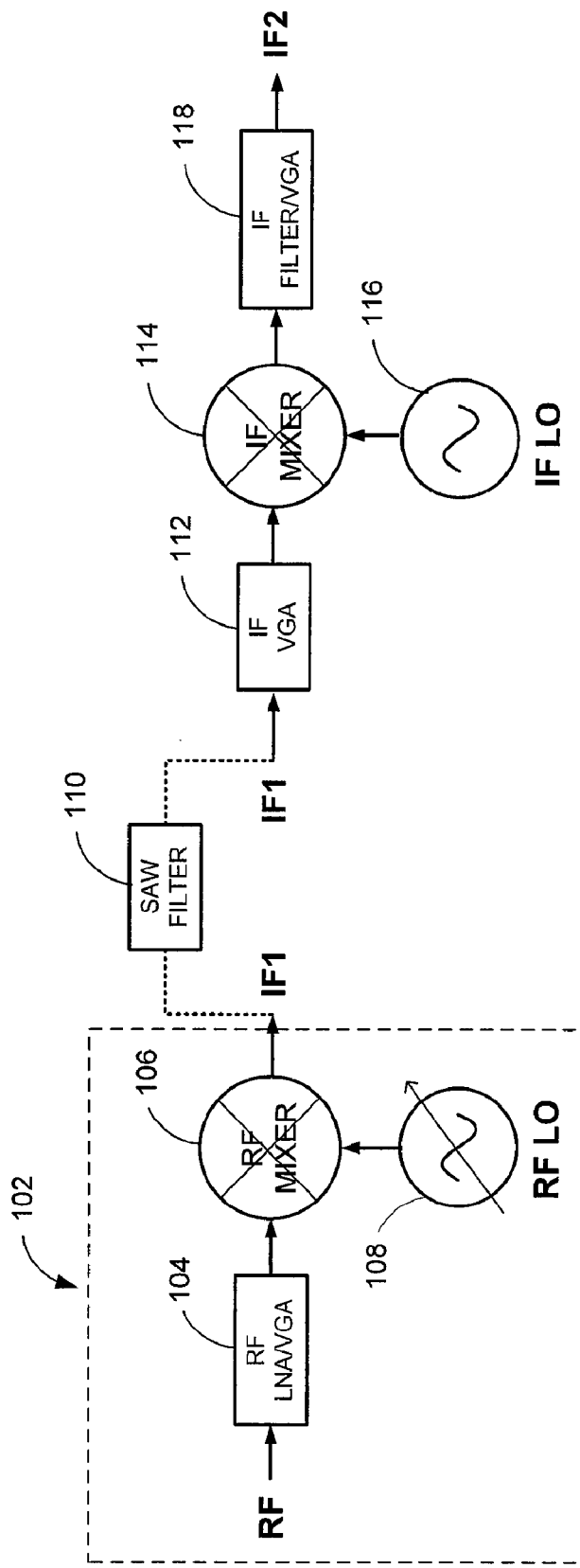
FIG. 1 depicts a general block diagram for the dual-conversion architecture for a receiver.

Having summarized various aspects of the present disclosure, reference will now be made in detail to the description of the disclosure as illustrated in the drawings. While the disclosure will be described in connection with these drawings, there is no intent to limit it to the embodiment or embodiments disclosed herein. On the contrary, the intent is to cover all alternatives, modifications and equivalents included within the spirit and scope of the disclosure as defined by the appended claims.

Embodiments of systems for providing image noise suppression through a broadband tuner having an image rejection filter are described. Embodiments include an RF variable gain attenuator with a broadband image rejection filter having programmable bandwidth. FIG. 1 shows a functional block diagram of a dual conversion architecture for terrestrial/cable TV tuners with an IF output. The dual conversion receiver consists of an up-converter front-end section 102 and a down-converter back-end section. The front-end 102 contains a low noise amplifier 104, a wide band linear mixer 106 and an RF local oscillator 108. The mixer 106 up converts the input amplified RF frequency band to a fixed first IF (intermediate frequency) frequency centered at, for example, 1220 MHz. The up converted frequency band is filtered by the external SAW filter 110. The signal is then amplified or attenuated to an appropriate level and fed into the second mixer 114 to translate the signal down to a second IF for further process through filtering and amplification 118. The receiver may be, but is not limited to, a broadband television tuner or any type of receiver used in radio frequency communications.

Figure 2:
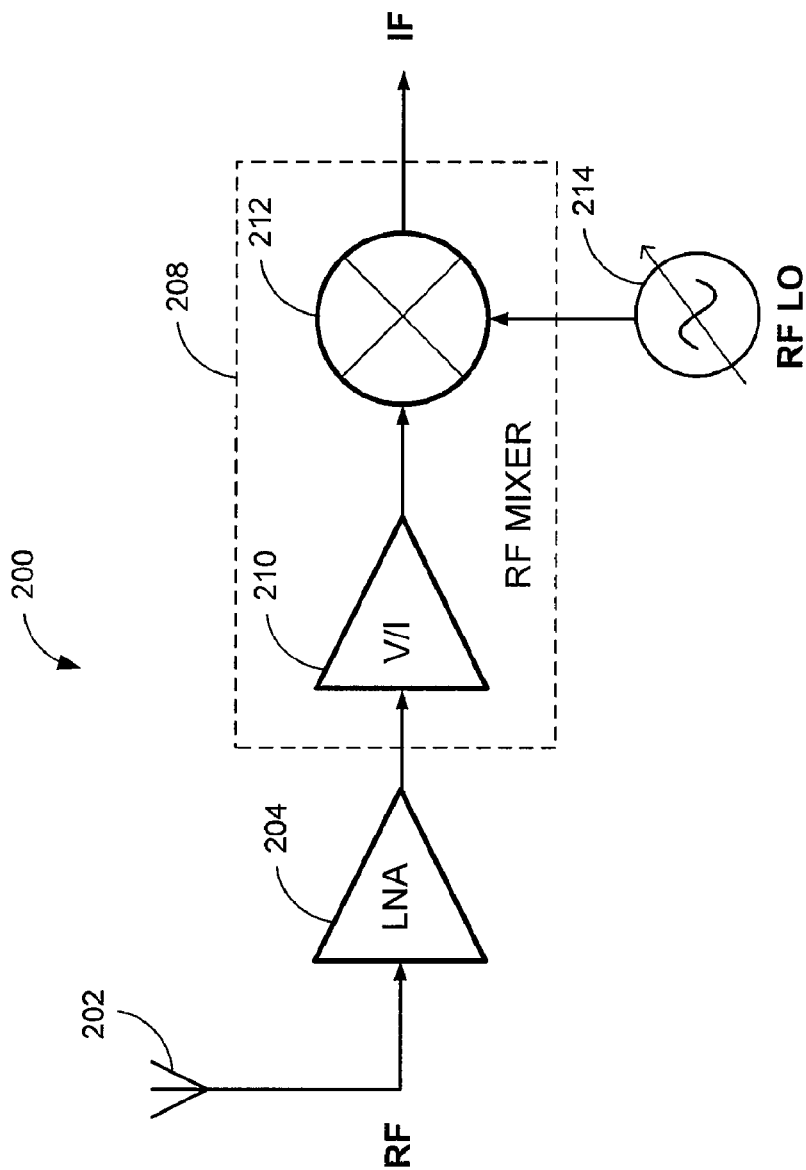
FIG. 2 depicts the RF front-end of a dual-conversion receiver with the V/I converter included in the RF mixer.

FIG. 2 shows a general block diagram for the RF front-end 200 of the receiver. The front-end 200 receives and conditions an RF signal before the signal is processed further down the system. Generally, the front-end encompasses everything between the received RF signal and the frequency converted IF signal. The RF front-end 200 may include an antenna 202, a low noise amplifier 204, a mixer 208 which includes a switch mixing block 212 and a V/I converter 210, and a local oscillator 214.

The antenna 202 receives the signal and passes the signal to the LNA 204 where the RF signal is amplified. Because the incoming signal is typically weak, the LNA 204 boosts the signal in order to increase the desired signal strength to be processed in the following stages and to reduce the noise contribution of the subsequent blocks. However, while boosting the signal level, the LNA 204 may also inject noise and distortion such that retrieval of the incoming signal is more difficult in the later stages of the system.

The mixer 208 takes the incoming RF frequency and produces an intermediate frequency (IF) at a higher frequency. Within the mixer 208, the RF and the local oscillator (LO) frequency 214 are fed into the switch mixing block 212 to produce the IF frequency which is the difference between the LO and RF frequencies. It also produces a frequency which is the sum of the RF and LO frequencies. The generated signal at this frequency is unwanted and is filtered out by the external SAW filter 110 seen in FIG. 1. The SAW filter 110 at the same time allows the IF to pass through. One should note that there are thus two RF frequencies that will produce the exact same IF frequency based on the difference between the LO and RF frequencies. The signal at the unwanted RF frequency is known as the image frequency.

Figure 3:
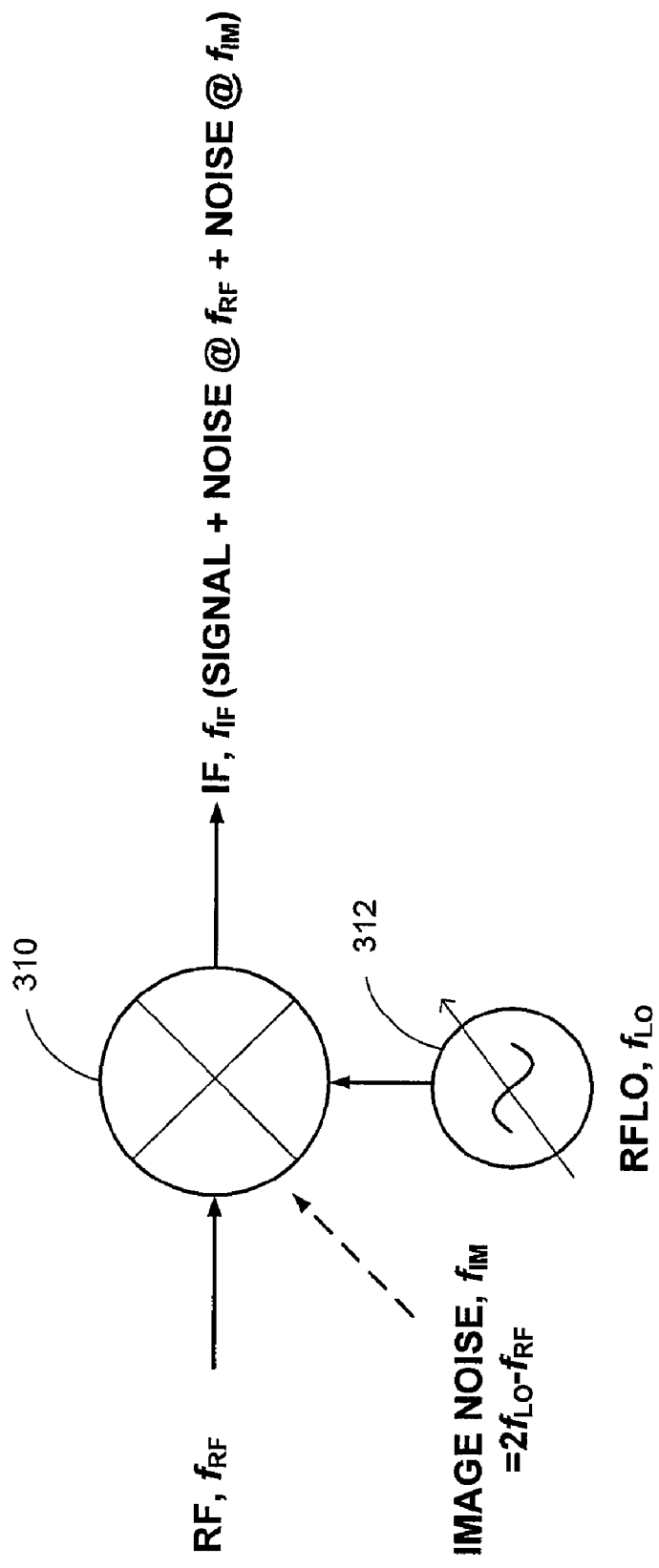
FIG. 3 depicts the injection of image noise into the mixer along with an RF signal.
Figure 4:
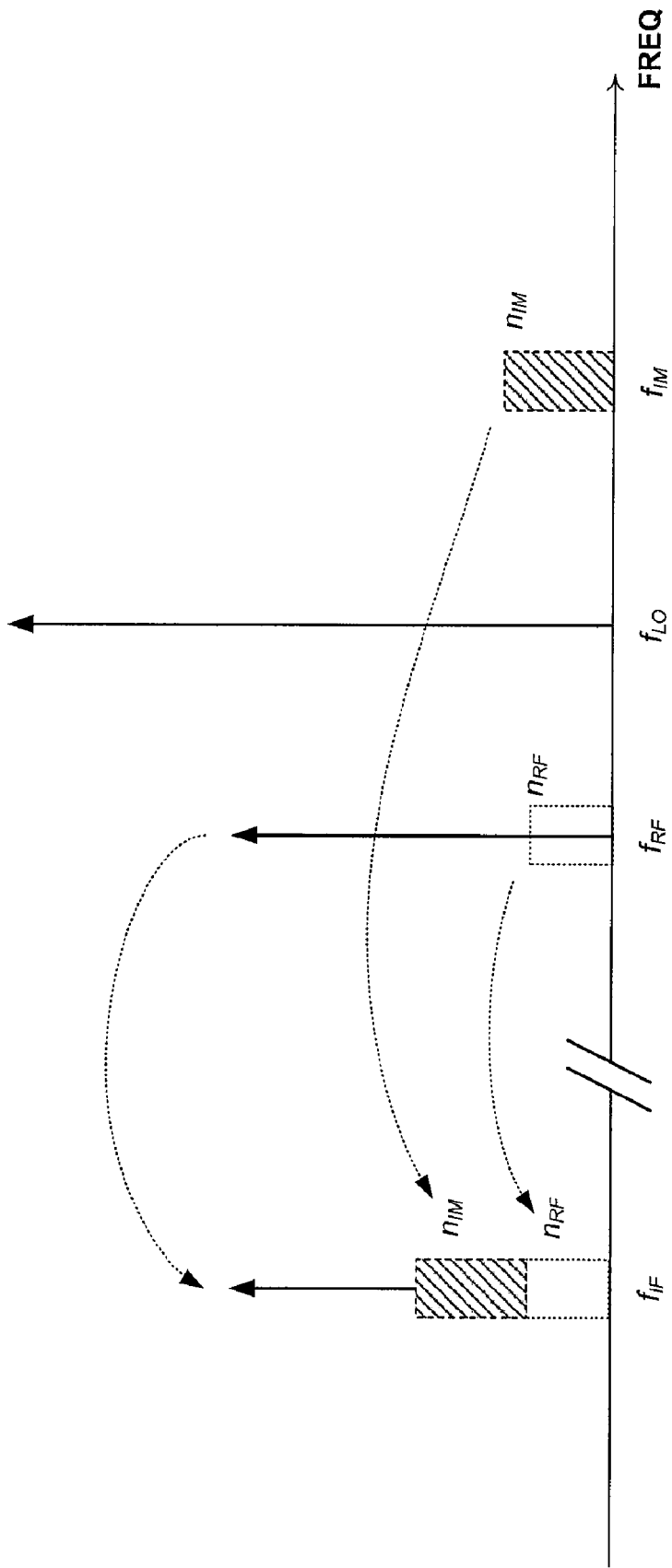
FIG. 4 illustrates how image noise affects the IF signal-to-noise ratio.

FIG. 3 depicts the injection of image noise into the mixer along with an RF signal. Image noise generated by the LNA 204 is fed into the mixer 310 along with an RF signal. The image noise frequency and the RF frequency undergo frequency translation through the mixer 310. Reference is now made to FIG. 4, which illustrates the impact of unwanted image noise on the IF signal. Under normal operating conditions where no noise is present, the received signal with frequency, $f_{RF}$, is sent to the mixer 310 where it is multiplied by the frequency of the local oscillator 312, $f_{LO}$, to translate the signal frequency to a desired IF which is the difference between $f_{LO}$ and $f_{RF}$. The undesired $f_{RF}+f_{LO}$ signal produced by the multiplication is filtered by the SAW filter 110 and filters at later stages. Tuning is performed by simply adjusting the frequency of the local oscillator according to the received signal RF frequency.

However, the presence of noise at certain frequencies can affect the IF signal. Also shown in FIG. 3 is an interfering signal at frequency, $f_{IM}$. If this signal is not filtered and is allowed to enter the mixer 310, the resulting sidebands are found at $f_{IM}+f_{LO}$ and at $f_{IM}-f_{LO}$. Suppose now that the value of $f_{IM}$ is such that $f_{IM}=2\,f_{LO}-f_{RF}$. The lower sideband of the mixed signal $f_{IMAGE}$ would then be found at exactly the same frequency as the upper sideband of the incoming signal as illustrated in FIG. 4. This image noise is generally undesirable in a receiver system. First, it is possible that an interfering signal at the image frequency will be mistaken for the received signal. Furthermore, image noise affects the overall noise figure (NF) of the receiver by contributing directly to the signal-to-noise (SNR) ratio of the input signal. This ultimately results in decreased sensitivity of the receiver. Therefore, minimizing the image noise is an important consideration in designing an RF front-end, especially for broadband TV receivers. The noise figure (NF) refers to the ratio of the signal-to-noise (SNR) of the input signal to the SNR of the output signal:

$$NF=SNR_{INPUT}(dB)-SNR_{OUTPUT}(dB) \quad [1.0]$$

Figure 5:
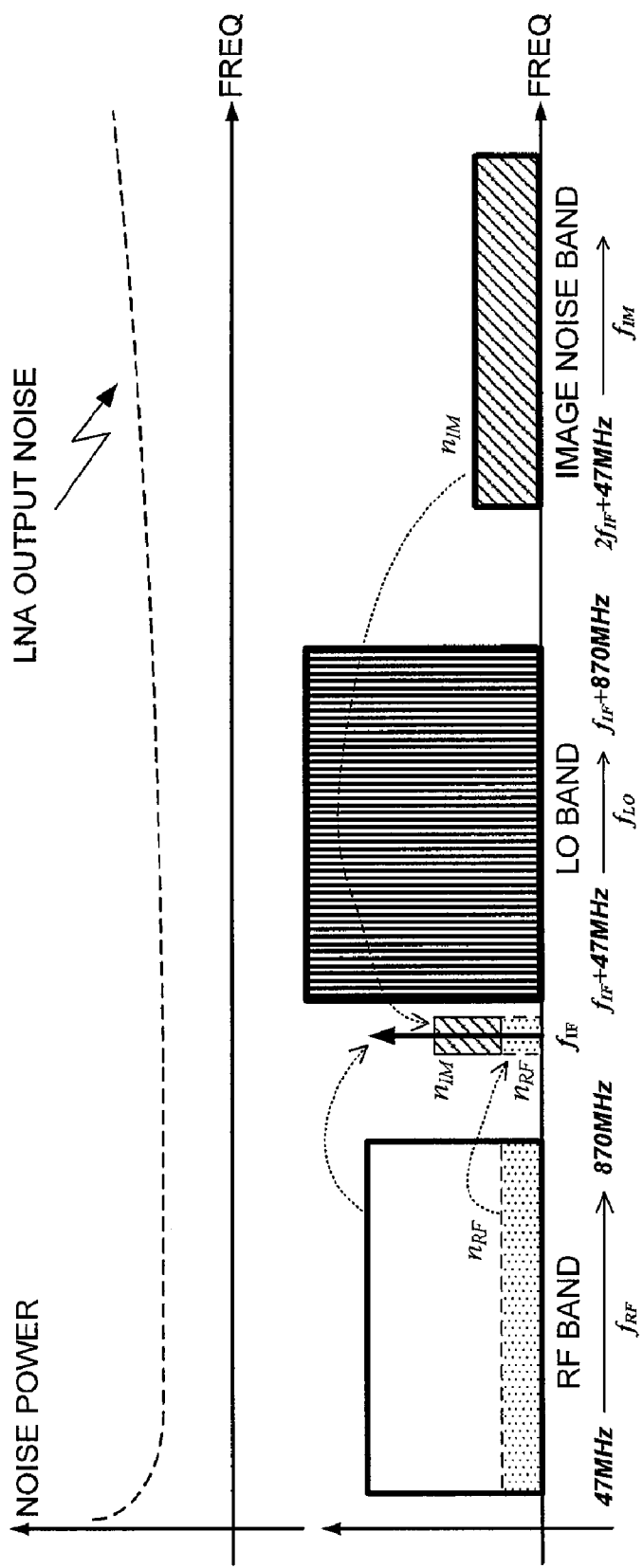
FIG. 5 illustrates the LNA output noise frequency spectrum and how LNA induced image noise is folded into the fixed IF in the dual-conversion broadband TV tuner.

Image noise induced by a LNA in a broadband TV tuner can add more than 3 dB to the cascaded noise figure of the RF front-end. FIG. 5 shows the LNA noise profile in the frequency domain and illustrates how the noise power at the image band is folded into the same IF band that the RF signal band is translated to.

Generally, a common approach for filtering out image noise involves placing a passive filter in front of the mixer to block interfering signals such as image noise. However, use of a standalone filter requires an extra buffer to drive the passive filter. The extra buffer required for a passive filter results in higher power consumption for the receiver front-end. Furthermore, the loss due to the passive filter in conjunction with the extra buffer stage actually increases the total noise figure. Therefore, the level of broadband noise suppression from standalone passive filters is limited.

Figure 6:
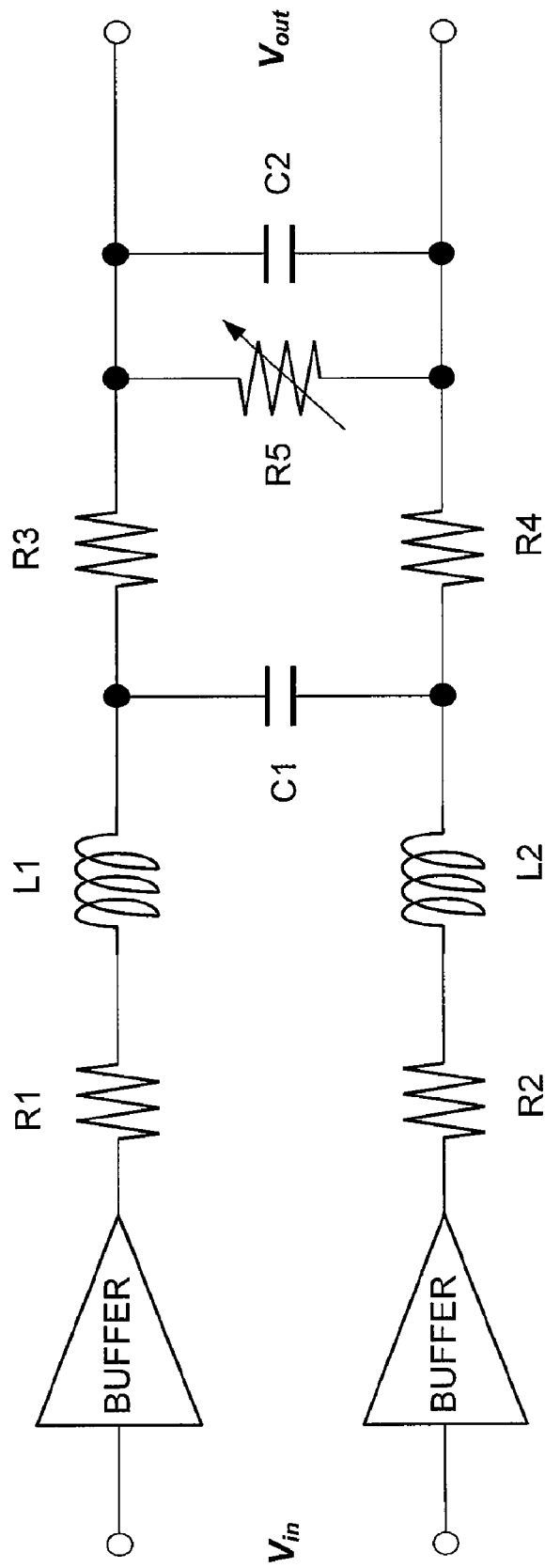
FIG. 6 shows an embodiment of a system for suppressing image noise with an RF variable gain attenuator with an embedded three pole image rejection filter.
Figure 7:
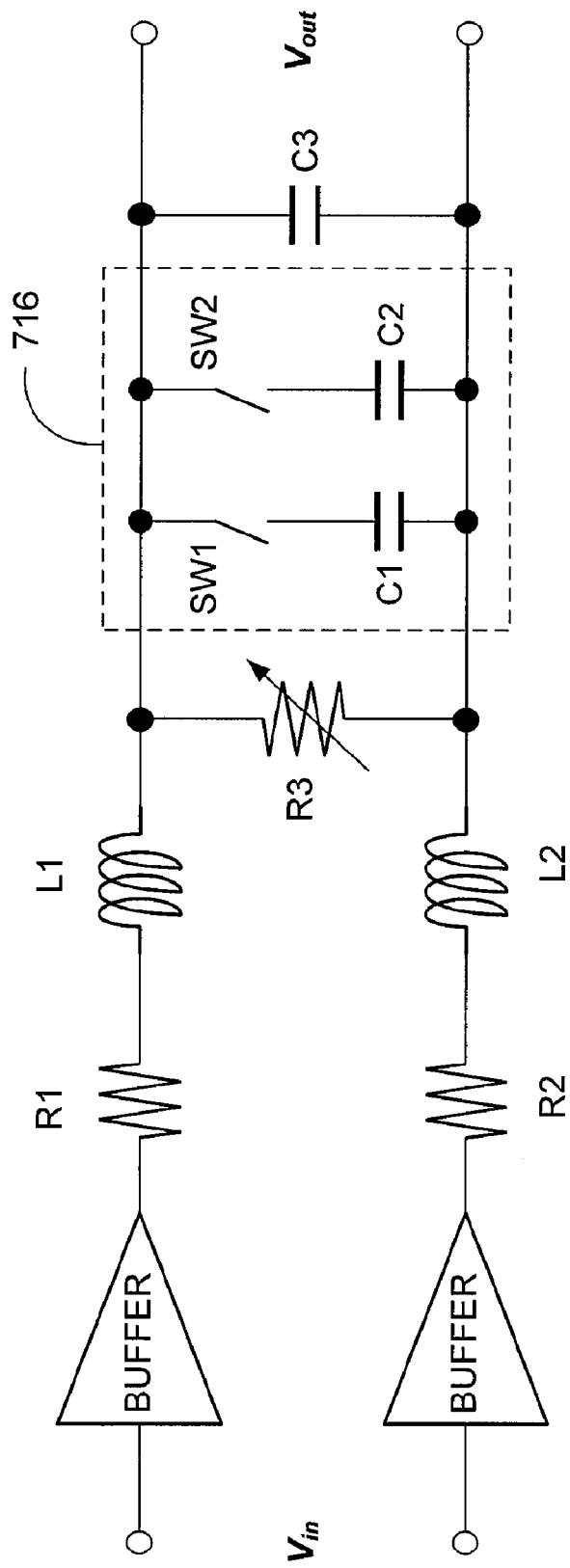
FIG. 7 shows an alternative embodiment of a system for suppressing image noise with an RF variable gain attenuator, which incorporates a two pole image rejection filter with programmable bandwidth through an array of capacitors.

Embodiments for suppressing image noise provide improvements over conventional approaches. In some embodiments, the programmable bandwidth feature of an embedded filter in an RF attenuator simplifies the design of the RF variable gain attenuator while providing sufficient image noise reduction through the use of a low-order pole variable impedance. Another aspect is that the attenuator provides high linearity as well as image rejection in the mixer stage while also eliminating the need for a complex mixer design, thereby resulting in reduced costs. The programmable RF image noise filter of the attenuator can be further extended to any filter in the RF front-end to suppress the image noise induced by the building blocks in the RF front-end chain effectively. The attenuator also reduces excess gain roll-off. Therefore, the RF attenuator achieves excellent image noise rejection while improving on gain roll-off. This is achieved through series inductors with R1 and R2 as shown in FIGS. 6 and 7. This provides gain peaking close to the flat band edge before the gain begins to roll off. Furthermore, this is accomplished without affecting other performance parameters such as linearity and power consumption.

In designing an RF variable gain attenuator, an RLC (resistor-inductor-capacitor) filter with a variable resistor may be implemented with two poles or three poles. FIG. 6 shows an embodiment of a system for suppressing image noise with an RF variable gain attenuator with an embedded three pole image rejection filter. The higher the number of poles, the steeper the out-of-band attenuation for the filter response. However, while a three pole variable resistor scheme provides steeper out-of-band attenuation, the three pole embodiment experiences a gain peak at the maximum attenuation and also suffers from decreased linearity at the maximum and mid attenuation levels.

On the other hand, an RF variable gain attenuator with a two pole variable resistor scheme provides better overall performance. The RF variable gain attenuator doesn't experience the same shortcomings as the three pole configuration. The two pole configuration not only provides better linearity, but also provides smaller gain roll-off across the frequency range of the filter. However, the two pole scheme alone does not provide sufficient rejection of image noise. Therefore, alternative embodiments provide for a two pole configuration with adjustable bandwidth feature in order to provide sufficient image noise suppression.

FIG. 7 shows an alternative embodiment of a system for suppressing image noise with an RF variable gain attenuator, which incorporates a two pole image rejection filter with programmable bandwidth through an array of capacitors. The circuit in FIG. 7 shows one embodiment of the RF variable gain attenuator with an adjustable bandwidth through the use of a capacitor array 716. The programmable capacitor array 716 is controlled by various switches SW1, SW2 to generate various capacitance values. One should note that if the input frequency is known, the passband of the adjustable bandwidth RF attenuator can be selected to optimize the in-band response and to maximize image frequency attenuation. The capacitor array 716 comprises a first capacitor C1 connected in series with a first switch SW1 and a second capacitor C2 connected in series with a second switch SW2. For the embodiment shown, the two capacitors C1, C2 are connected in parallel. By controlling the state of switches SW1, SW2, the capacitors C1, C2 may be electrically connected or disconnected. For this particular embodiment, four different settings can be selected which produces four different bandwidth settings. The bandwidth settings define the passband for the filter. By way of example, setting 1 may be pre-defined such that a passband from 47 MHz to 390 MHz is produced. Therefore, signals between 47 MHz and 390 MHz are allowed through while signals outside of this passband are filtered. Likewise, setting 2 may be pre-defined such that a passband from 391 MHz to 480 MHz is produced. Table 1 shows different programmable passbands for one embodiment, which may be programmed through the use of SW1 and SW2.

TABLE 1

| SW1 | SW2 | FREQUENCY RANGE |
|---|---|---|
| CLOSED | CLOSED | 47 MHz-390 MHz |
| CLOSED | OPEN | 391 MHz-480 MHz |
| OPEN | CLOSED | 481 MHz-617 MHz |
| OPEN | OPEN | 618 MHz-860 MHz |

One should note that for some embodiments, the variable resistor R3 in FIG. 7 may be implemented in various ways including, but not limited to, use of MOS transistors. The MOS transistor configuration may include an NMOS transistor, a PMOS transistor, or a combination of both. Furthermore, one should note that the programmable capacitor array 716 may be implemented as two branches, each branch having two capacitors with a programmable switch in the middle.

Figure 8:
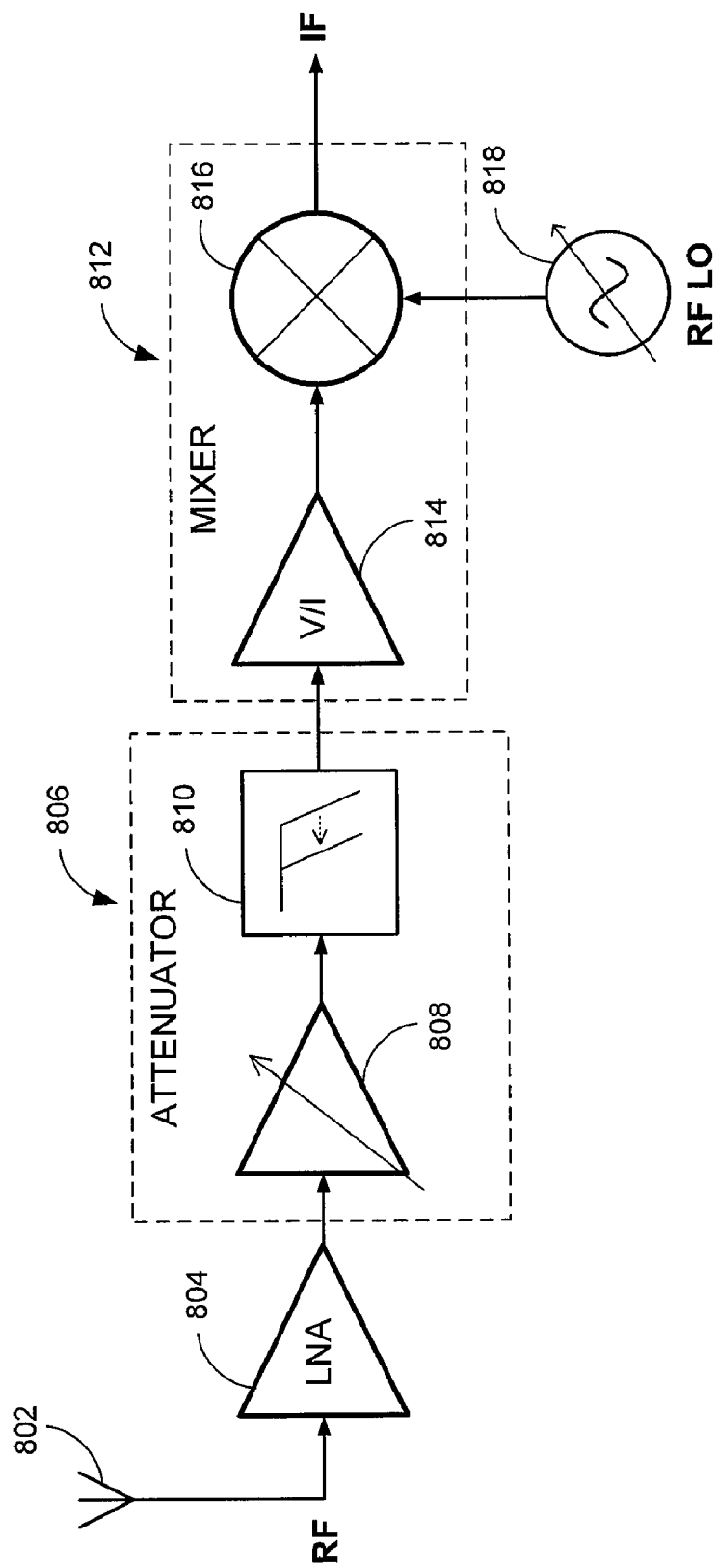
FIG. 8 illustrates one embodiment of a system for suppressing image noise where an RF variable gain attenuator embedded with an adjustable bandwidth image rejection filter is integrated into an RF front-end.
Figure 9:
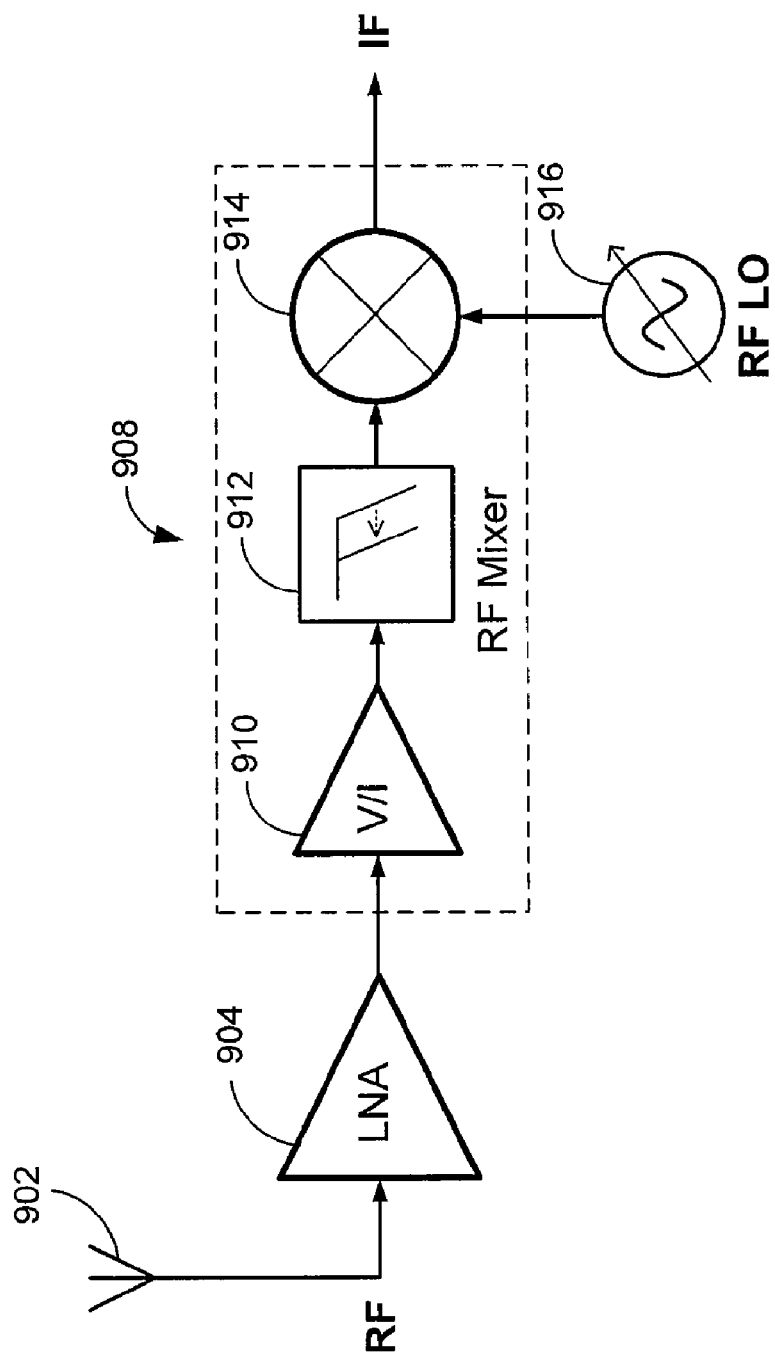
FIG. 9 illustrates an alternative embodiment of a system for suppressing image noise where a mixer embedded with an adjustable bandwidth image rejection filter is integrated into an RF front-end.

FIG. 8 illustrates one embodiment of a system for suppressing image noise where an RF variable gain attenuator embedded with an adjustable bandwidth image rejection filter is integrated into an RF front-end. The RF variable gain attenuator adjusts the level of the signal entering the mixer to its optimum level. The RF variable gain attenuator may be implemented as a low pass filter with a programmable bandwidth. The RF front-end shown includes an antenna 802, an LNA 804, an RF variable gain attenuator 806, a mixer 812, and an LO 818. As in FIG. 2, the antenna 802 receives the signal and passes it to the LNA 804 where the received signal is amplified by a fixed gain. The LNA 804 adjusts the incoming signal to the desired level. However, in the embodiment shown, any noise injected by the LNA 804 is filtered out by the RF variable gain attenuator 806 placed after the LNA 804. The passband of the RF variable gain attenuator 806 is defined by the flat gain bandwidth. As shown in FIG. 8, the RF variable gain attenuator 806 is comprised of a variable gain stage 808 and a filter with adjustable bandwidth 810. The RF variable gain attenuator 806 filters out any unwanted image noise generated by the LNA 804 and other sources. Thereafter, the RF signal is fed into the mixer 812 along with the LO 818 to produce an IF signal. The noise figure of the overall system is reduced because any image noise falling outside the passband of the RF variable gain attenuator 806 is filtered out. One should note that in alternative embodiments, the image rejection filter with programmable bandwidth may be integrated into the V/I converter of the mixer. Reference is made to FIG. 9, which illustrates an alternative embodiment of a system for suppressing image noise where a mixer 908 embedded with an adjustable bandwidth image rejection filter 912 is integrated into an RF front-end. For this embodiment, the image rejection filter 912 with programmable bandwidth is coupled to the V/I converter 910 of the mixer 908.

Figure 10:
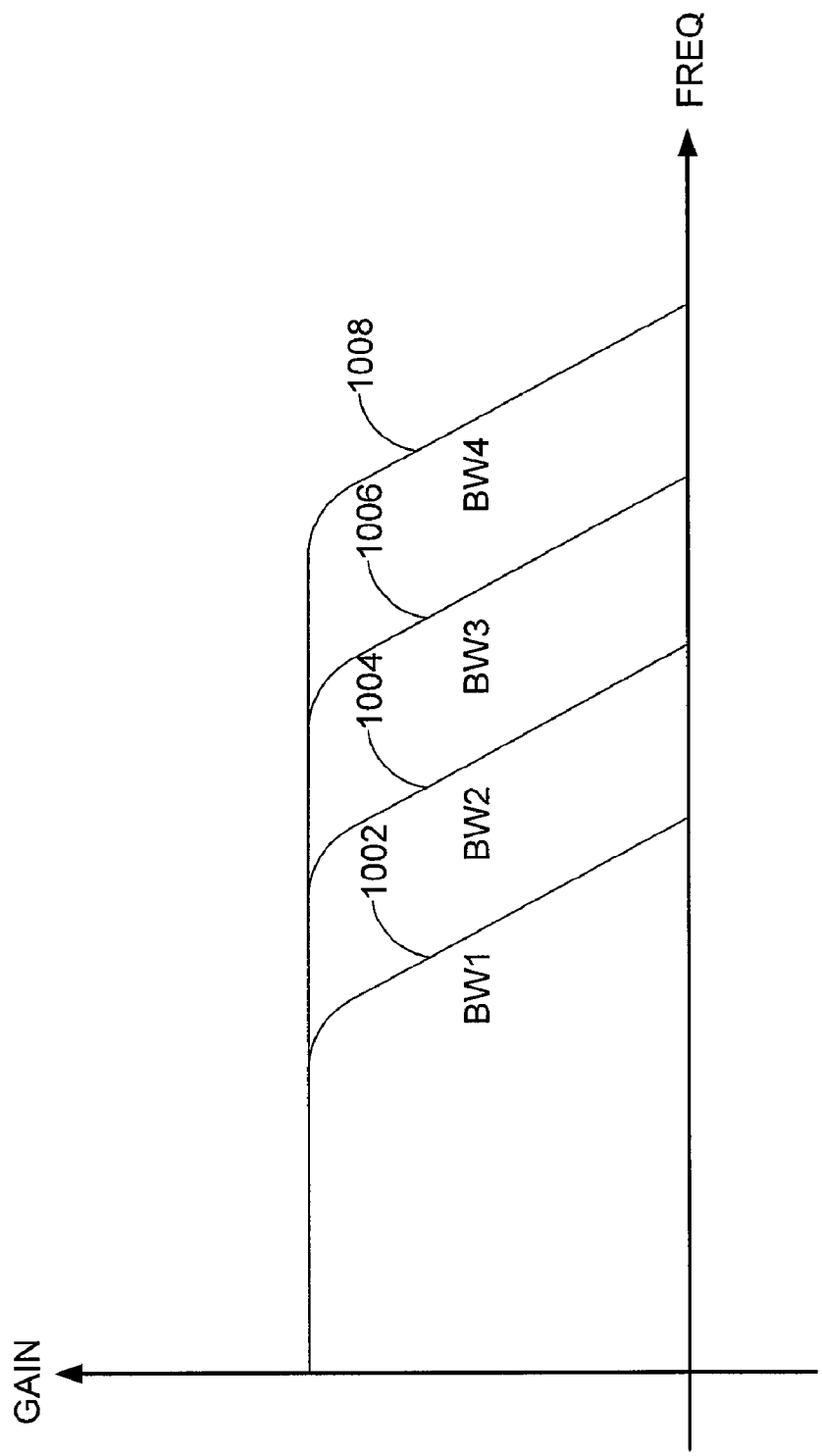
FIG. 10 illustrates various programmable bandwidths for an embodiment of an RF variable gain attenuator incorporated with an adjustable image filter.

FIG. 10 illustrates various programmable bandwidths for an embodiment of an RF variable gain attenuator incorporated with an adjustable image filter with programmable bandwidth. The available bandwidths 1002, 1004, 1006, 1008 are defined based on the setting of the capacitor array 716.

Figure 11:
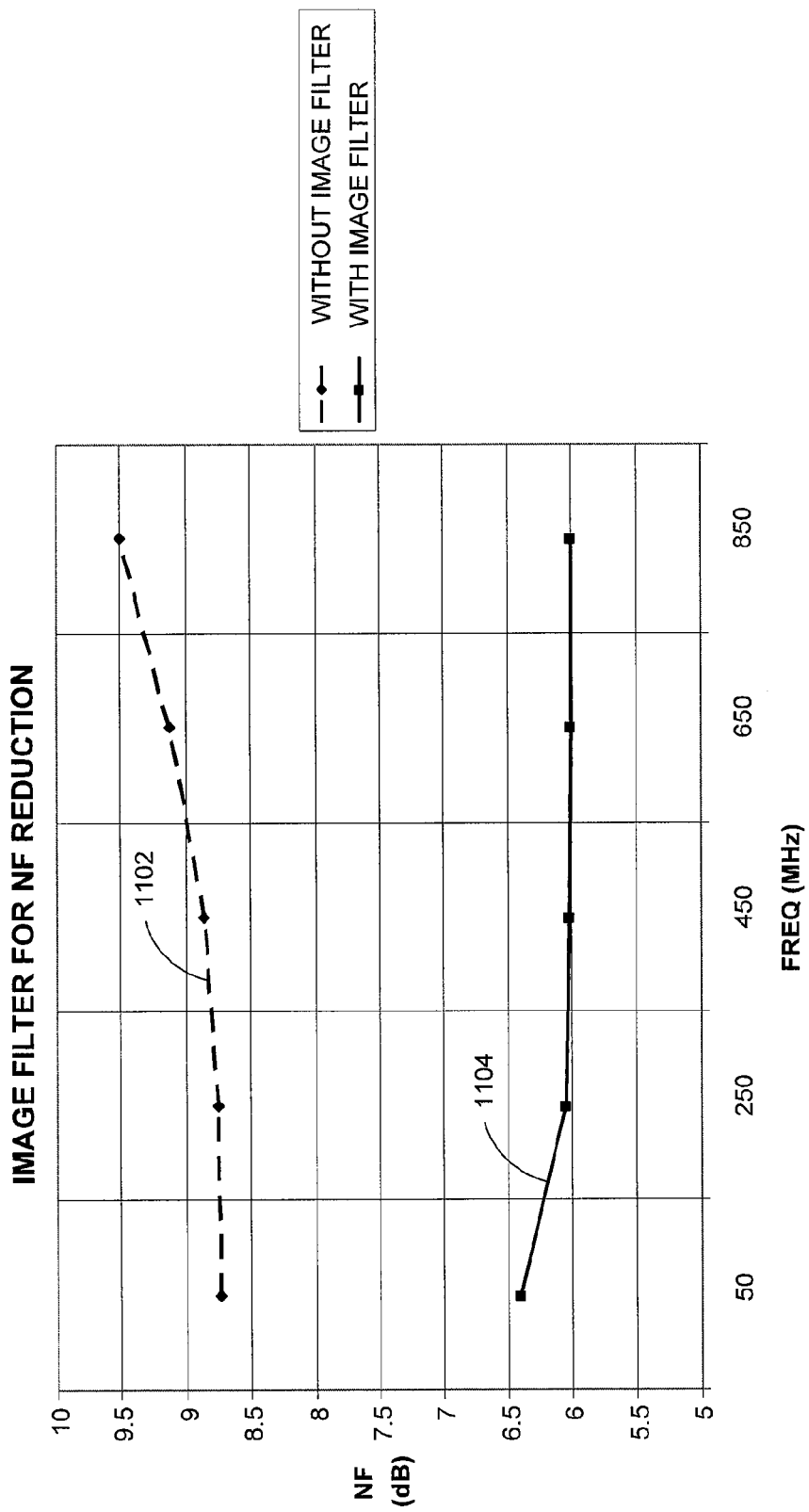
FIG. 11 is a plot showing the simulated noise figure for the system with and without the image rejection filter of the RF variable gain attenuator.

FIG. 11 is a plot showing the simulated noise figure for the system with and without the RF variable gain attenuator. Plot 1102 shows the noise figure without an image filter, while plot 1104 shows the noise figure with embodiments of the RF variable gain attenuator implemented into the RF front-end. As shown in the figure, there is a large improvement in the noise figure of the system. It should be noted that the aforementioned tuner with RF variable gain attenuator not only suppresses image noise, but does so without any additional power consumption and without injecting any additional noise.

Embodiments discussed herein may be implemented in (and/or associated with) one or more different devices. More specifically, depending on the particular configuration, functionality discussed herein may be implemented in a tuner board, a set-top box, a satellite system, a television, a computing device (e.g., laptop, PDA), a cellular telephone, a wireless communication receiver, and/or other devices.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

At least the following is claimed:

1. A system for suppressing image noise comprising:
   a low noise amplifier (LNA) configured to amplify a received RF signal;
   an RF variable gain attenuator with an image rejection filter with programmable bandwidth configured to suppress image noise and image interference, wherein the RF variable gain attenuator comprises:
     a low pass filter with an order of one or higher; and
     an adjustable capacitor array configured to provide a programmable bandwidth; and
   an RF mixer configured to perform frequency translation.

2. The system of claim 1, further comprising:
   an RF voltage controlled oscillator (RFVCO) configured to sample the frequency of the received RF signal in order to determine the bandwidth of the image rejection filter.

3. The system of claim 1, wherein the adjustable capacitor array comprises a plurality of capacitors coupled to a plurality of switches operative to provide different capacitance values.

4. The system of claim 1, wherein the adjustable capacitor array comprises means for providing different capacitance values.

5. The system of claim 1, wherein the adjustable capacitor array further comprises:
   a first capacitor electrically connected in series with a first switch; and
   a second capacitor electrically connected in series with a second switch.

6. The system of claim 5, wherein the adjustable capacitor array is operative to provide four selectable frequency ranges.

7. The system of claim 5, wherein the first capacitor and second capacitor are connected in parallel when the first switch and second switch are closed.

8. The system of claim 1, wherein the low pass filter is comprised of a passive resistor-inductor-capacitor filter operative to suppress broadband image noise.

9. The system of claim 1, wherein the RF variable gain attenuator is electrically connected to the output of the low noise amplifier.

10. The system of claim 1, wherein the low pass filter is a second order filter.

11. The system of claim 1, wherein the RF variable gain attenuator is embodied in at least one of the following: a tuner board, a set-top box, a satellite system, a television, a computing device, a cellular telephone, and a wireless communication receiver.

12. A method for suppressing image noise comprising:
   receiving an RF signal;
   amplifying the RF signal;
   programming a frequency band such that any image noise present is located outside the frequency band;
   suppressing the image noise while allowing the RF signal to pass, wherein suppressing the image noise is performed using a low pass filter and an adjustable capacitor array configured to provide a programmable bandwidth; and
   mixing the RF signal to perform frequency translation.

13. The method of claim 12, wherein at least a portion of the method is performed in at least one of the following: a tuner board, a set-top box, a satellite system, a television, a computing device, a cellular telephone, and a wireless communication receiver.

14. A system for suppressing image noise comprising:
   a low noise amplifier (LNA) configured to amplify a received RF signal; and
   an RF mixer with a V/I converter embedded with an image rejection filter with programmable bandwidth configured to suppress image noise and image interference, wherein the image rejection filter comprises:
     a low pass filter with an order of one or higher; and
     an adjustable capacitor array configured to provide a programmable bandwidth.

15. The system of claim 14, wherein the image rejection filter is embodied in at least one of the following: a tuner board, a set-top box, a satellite system, a television, a computing device, a cellular telephone, and a wireless communication receiver.

* * * * *